United States Patent
Eicher

(10) Patent No.: US 6,711,804 B2
(45) Date of Patent: Mar. 30, 2004

(54) MACHINING CENTER

(75) Inventor: Gerrit Eicher, Overath (DE)

(73) Assignee: EMAG Maschinenfabrik GmbH, Salach (DE)

( * ) Notice: Subject to any disclaimer, the term of this patent is extended or adjusted under 35 U.S.C. 154(b) by 2 days.

(21) Appl. No.: 10/287,755

(22) Filed: Nov. 4, 2002

(65) Prior Publication Data

US 2003/0094742 A1 May 22, 2003

(30) Foreign Application Priority Data

Nov. 5, 2001 (DE) .......................... 101 53 807

(51) Int. Cl.⁷ .................... B23P 23/02; B23B 39/02; B23C 1/04
(52) U.S. Cl. .................... 29/563; 29/27 R; 29/564; 29/38 A; 82/129; 82/122; 82/138; 408/37; 408/43; 409/192; 409/203; 409/158; 409/159; 409/161; 409/165
(58) Field of Search .................... 29/36, 563, 564, 29/38 A, 38 B, 38 R, 27 C, 27 R; 82/129, 122, 138; 408/37–38, 43–45; 409/192, 203, 213, 217, 158–159, 161, 165

(56) References Cited

U.S. PATENT DOCUMENTS

| | | | | | |
|---|---|---|---|---|---|
| 2,271,848 A | * | 2/1942 | Tcimpidis | ................ | 29/38 C |
| 2,393,696 A | * | 1/1946 | Kraut et al. | ................ | 29/26 R |
| 2,877,670 A | * | 3/1959 | Allen | ................ | 408/44 |
| 4,163,313 A | * | 8/1979 | Matsuno et al. | ................ | 29/563 |
| 4,520,595 A | * | 6/1985 | Diener | ................ | 29/563 |
| 4,730,373 A | * | 3/1988 | Senoh | ................ | 408/38 |
| 5,674,169 A | * | 10/1997 | Yang | ................ | 29/563 |
| 5,697,270 A | * | 12/1997 | Link | ................ | 82/129 |
| 5,815,902 A | * | 10/1998 | Osterried et al. | ................ | 29/38 A |
| 5,819,395 A | * | 10/1998 | Faitel | ................ | 29/563 |
| 5,832,590 A | * | 11/1998 | Wuerthner | ................ | 29/563 |
| 5,940,948 A | * | 8/1999 | Rehm | ................ | 29/563 |
| 6,158,312 A | * | 12/2000 | Link et al. | ................ | 82/129 |
| 6,178,608 B1 | * | 1/2001 | Koch | ................ | 29/563 |
| 6,298,759 B1 | * | 10/2001 | Herrscher et al. | ................ | 82/129 |
| 6,457,919 B1 | * | 10/2002 | Sangster | ................ | 409/203 |

FOREIGN PATENT DOCUMENTS

| | | | |
|---|---|---|---|
| DE | 2526584 A1 | * | 12/1976 |
| DE | 195 04 369 | | 8/1996 |
| DE | 019916212 A1 | * | 10/2000 |
| EP | 000839601 A1 | * | 5/1998 |

* cited by examiner

Primary Examiner—Erica Cadugan
(74) Attorney, Agent, or Firm—Herbert Dubno

(57) ABSTRACT

A machine tool in which a plurality of machining positions is orbited by a work spindle unit carrying a workpiece and capable of radial displacement relative to the central axis of rotation. The work spindle unit may be one of one or more such units mounted upon a bridge element angularly displaceable about that axis.

15 Claims, 5 Drawing Sheets

MACHINING CENTER

FIELD OF THE INVENTION

My present invention relates to a machine tool and, more particularly, to a machining center having a multiplicity of stations at which machining operations can be carried out. Also the invention relates to a machining center of the type in which the multiplicity of machining stations are arrayed about a central axis.

BACKGROUND OF THE INVENTION

A machining center having a central axis and a multiplicity of positions or stations at which machining can occur arrayed around the axis is known. The machining center can be used primarily for the machining of metal workpieces by turning, milling, drilling or the like machining operations. They enable, for example, one workpiece to be machined at a first station while other workpieces are machined at other stations and each workpiece to be transferred from a first to a second station and so on until the machining operations are completed. The machining center permits not only a succession of different machining operations to be carried out upon a given workpiece but also a number of workpieces to be operated upon simultaneously to thereby increase productivity, reduce machining time and minimize the machining cost. When, in addition, the workpiece transfer between stations or positioning of the workpiece at the respective station is effected automatically, manual intervention is reduced to a minimum, and cost is similarly reduced.

In German patent document DE 195 04 369 Al, a multi-spindle machine tool is described which has a multiplicity of spindles in a frame rotatable about an axis, the spindle each engaging a workpiece and being rotatable. The arrangement of the spindles in this system is, however, fixed relative to the frame and the entire frame can be set into rotation in increments of, for example 45° about the central axis so that the workpiece on each spindle is presented to a new working station or sector at which it can be engaged by a tool.

The tools in each sector can then be moved towards the workpiece to allow machining of the latter when it is set into rotation through the respective spindle or even while it is at standstill.

The fixed arrangement of the individual spindle with respect to the axis, even with the freedom of rotation of the spindles between stations, has the disadvantage that the tool in each working sector or machining station must be movable toward and away from or relative to the workpiece. In point of fact the tools are mounted to enable radial movement of the tools relative to the spindles. The positioning of the workpieces on the spindles at the work stations is then exclusively by the rotation of the entire spindle assembly and each spindle may be vertically displaceable to vary the vertical position of the workpiece holder at each station.

The horizontal position of each workpiece in the particular machining sector or station is fixed and usually located along a center line through the particular sector or station. In German patent document DE 199 16 212 Al, the spindles within a sector or station can be movable along a predominantly circular path. This allows a spindle unit to cooperate within each machining sector or station with, for example, two different tools while in at least one other station the spindle is not moved. This permits various machining processes, some of which can be more time extensive than others, to be optimally combined with each other. It also enables a more flexible arrangement or use of the tools in the individual machining stations or sectors.

Nevertheless this machine has the disadvantage that within each sector only a limited number of tools can be arranged. Additionally for the system of DE 199 16 212 as well as that of DE 195 04 369, after a complete machining cycle, the array of spindles is periodically rotated back through about 360° to return the individual spindles to their starting positions when extensive slide contacts and distributors are to be avoided for the electrical and fluid lines. A further drawback is that in each machining sector the tool must be mounted for radial shiftability when a relative radial movement of the workpiece and tools is required for the machining purpose. For each tool, therefore, there must be a corresponding feed and guide arrangement which has its own drive and that can be costly, especially when a large number of tools is provided.

OBJECTS OF THE INVENTION

It is, therefore, the principal object of the present invention to provide a machine tool and especially a machining center whereby the aforementioned drawbacks are avoided.

Another object of the invention is to provide, in a machine tool of the aforedescribed type, an arrangement which reduces the cost for multi-axis machines, limits the size of the machining stations which are required for that purpose and ensures reduction in time for multi-step machining operations.

SUMMARY OF THE INVENTION

These objects and others which will become apparent hereinafter are attained, in accordance with the invention in a machine tool and especially a machining center having a spindle unit, also referred to as a work spindle unit which is mounted to orbit a central axis and, of course, can be rotatable about its own axis. At least one such spindle unit is provided so that it can be positioned in at least one but preferably a plurality of positions spaced around the central axis and so that at least some of the stations can be provided with tool units. The at least one work spindle unit, in addition, is movable in the radial direction relative to the central axis and, in an embodiment of the invention, across or through this axis to a position or station at the opposite sides of the orbit.

The movement of the at least one work spindle unit in the radial direction may be independent of any positioning movement thereof of the workpiece relative to the work spindle unit and independent of any positioning movement of the tool or tools at the particular station.

The system of the invention, therefore, provides that the workpiece, which can be mounted on the work spindle unit, can be shiftable in the radial direction within a machining sector or station independently of any positioning movement required for the machining practice at that station itself. The work spindle unit, by being orbital about the central axis can position the workpiece at any of the machining sectors or stations thereby contributing additional degrees of freedom of movement and especially the freedom of movement of the radial direction, or movement of the workpiece so as to place the workpiece in a position where it can be attacked by a tool at that station, i.e. for positioning the workpiece and/or for the machining itself or to allow selection of the tool which is to engage the workpiece.

Through this additional radial mobility of the work spindle unit it is possible to dispose tools along various partial circular paths or circular path segments in any of the machining sectors or stations for contact with the workpiece so that a feed device can be eliminated for all or for some of the tools at the particular sector or station or such that none of the tools or not all of the tools need be provided with respective feed units.

In combination with the vertical mobility of the workpiece, each can be provided by the working spindle unit, each machining sector or station can have a multiplicity of tools at different spacings from the central axis and at different vertical positions or heights for respective contact with the workpiece.

The radial movement of the work spindle unit can be decoupled advantageously from the positioning movement of the spindle unit. The term "positioning movement" when referring to the spindle movement will be understood to be that movement of the workpiece which causes machining when the workpiece engages a tool. That will be understood to be distinct from the radial movement of the workpiece holder, namely, the work spindle unit which has been referred to before and may be provided in addition to the positioning movement and may, for example, enable the workpiece to be displaced linearly to position the axis to the opposite side of the orbit.

The work spindle unit is held in a frame or support which can receive a plurality of work spindle units, each of which is capable of the aforementioned radial displacement. If this frame is rotated, say 45° about the central and usually vertical axis to position the work spindle unit and workpiece at successive machining sector or station, the orbit can encompass eight such stations and the frame can have two radially movable work spindle units disposed at diametrically opposite sectors or stations and each being radially displaceable to position its workpiece for engagement by any number of tools at the particular sector. A selected one of the work spindle units, of course, can be capable of radial displacement at any selected sector while another radial spindle unit is fixedly positioned on the frame at its sector if desired. This allows, for example, a machining process to be carried out for a relatively long time in the latter sector while in the former two or more different machining steps can be carried out which are shorter in time with the workpiece being positioned first at the one tool and then by radial displacement to a tool further from the central axis or closer to the central axis by a second tool.

Advantageously the frame is in the form of a bridge which can be rotated about the central axis and has been found to be an exceptionally stable structure for supporting one or more work spindle units. The bridge may be symmetrically designed to extend over all of the sectors or stations and to be guided on a track of path which surrounds the machining sectors or stations. The bridge or bridge unit, upon which the work spindle units are movable radially with respect to the central axis may have generally radial guide members upon which the work spindle units or carriages are shiftable. The path formed by the track is usually circular and the bridge may be supported thereon with line or surface contact via suitable sliding shoes and plane bearings or roller bearings or wheels to provide sufficient stability to the support of the bridge. The bridge can have two opposite legs which ride upon the track and can be supported thereon with suitable support surfaces. Of course, the bridge can have a cruciform shape and can be supported with four legs or feet on the track.

The bridge is driven, according to a feature of the invention by at least one drive in such manner that it is rotated point symmetrically about the central axis. For a uniform force transfer it is also conceivable to provide a plurality of drives distributed uniformly over the periphery of the orbit or located at opposite sides thereof. In such cases linear drives can be contemplated.

In an advantageous embodiment of the invention the path provided on the bridge for the work spindle unit can extend substantially over the entire length of the bridge. This is desirable for the case in which a single work spindle unit is intended to carry a workpiece from a station or sector on one side of the axis to a station and center on the opposite sides of the axis, possibly in a successive step. In this case, the spindle is moved substantially along a diameter of the circle defined by the track or constituting the orbit of the ends of the bridge. The transfer of a workpiece by the work spindle unit from a first machining sector to one on the opposite sides of the center can thus be accomplished in the shortest possible time or with a time saving.

The positioning of a work spindle unit which is displaceable along the track of the bridge can be effected advantageously in the following manner. The work spindle unit is initially brought to a first spindle region, i.e. a machining sector or station, on one side of the bridge unit and can be swung exclusively by rotation of the bridge itself through not more than 180° about the central axis to one-half of the machining sectors and shifted to the other half by radial displacement over the length of the bridge to the sectors lying on the opposite side also through 180°. The machining can thus be effected in one sector after the other over the arc of 180° on the one side and when the machining is required in any of the other sectors, i.e. outside the original 180° arc and on the opposite side of the orbit, the work spindle unit is displaced radially on the track of the bridge to the sector on the other side. Once there, of course, it can be moved to any of the sectors along the other 180°. The system, therefore, allows the bridge to rotate back and forth through 180° without having to make a full revolution while ensuring the possibility of machining the workpiece at any of the sectors. Within each machining sector or station, the spindle unit can, by displacement to a greater or lesser radial extent or by raising and lowering the spindle effect machining with a variety of tools at the particular station or sector as may be desired.

According to a feature of the invention a control unit can be provided which so regulates the swinging movement of the bridge and the movement of the working spindle unit from one to another end of the bridge or radially along the bridge as a function of the machining space to be carried out and to minimize the total machining time for a particular workpiece.

Of course the bridge may be rotated through more than 180° although a rotation in excess of 360° is not desirable so as to avoid for complicated slip rings or devices for distributing fluid to a rotating element.

The displacement of the work spindle unit along the bridge track can be rapid and can take place during angular displacement of the bridge, thereby permitting rapid transfer of a workpiece from one machining sector or station to another. The selection of the processing steps which can be carried out is simple so that the control unit not only has the advantage of optimizing the machining times but also step selection and combinations of machining steps to be practiced.

In a further advantageous embodiment of the invention a multiplicity of mutually and rigidly interconnected bridge units are provided. Each bridge unit can carry a working spindle unit which is displaceable in the aforedescribed manner, i.e. radially at least limitedly toward and away from the axis. The bridge can extend across the diameter of the orbital circle if desired and two further bridge units may be attached thereto and can be located parallel to one another and to the right and left of the centrally oriented bridge unit. Each of these bridge units may have a respective working spindle unit radially shiftable thereon so that each unit can be displaceable from one end to another of the particular bridge unit. The maximum displacement of a work spindle unit which is not mounted on a central bridge unit is thus shorter than the displaceability of the work spindle unit on the central bridge unit. In spite of this construction, even here and movement of the work spindle unit from one to another end of the bridge is possible and allows another machining sector or station to be selected which may not be directly opposite its original sector or station but rather may be a neighboring machining sector or station.

The result is the ability to provide a multiplicity of work spindle units and appropriate bridge structures which in combination with rotation of the bridge and radial displacement of the work spindle arrangement provides a highly flexible positioning of workpieces by a multiplicity of sectors and stations.

In another advantageous embodiment of the invention, a bridge unit is provided on which two work spindle units can be radially displaceable. In this case, each work spindle unit can be movable within a limited range and within its limited range can position the workpiece in engagement with a number of tools. The work spindle unit cannot be displaced here from one end of the bridge to the other but by doubling the number of work spindle units on a bridge can increase the number of work pieces being machined at a given time and thereby reduce machining time for a number of such workpieces.

The radial mobility of the two work spindle units can be achieved with the previously-mentioned track on the bridge and that track can extend the full length of the bridge although each unit may be displaceable over only a limited portion of that length.

The bridge unit can be so configured that it has a plurality of arms or allows three or more work spindle units to be spaced apart about the axis. Each spindle unit can be radially displaceable within a range and the bridge unit in that case will have the shape of a star whose arms are angularly equispaced at 120° relative to one another, each arm carrying one of the work spindle units.

Similarly the bridge can have more than three arms and work spindle units and it is preferred to provide a number of arms which are angularly equispaced about the central axis and each of which carries a respective work spindle unit. The number of arms can equal the number of sectors or machining stations. In the case of a system having five work spindle units, the bridge may have the shape of a five-pointed star.

In a further embodiment of the invention at least one of the work spindle units is so mounted on the bridge that in addition to its radial displaceability it may have a freedom of movement also in a tangential direction, i.e. in a direction perpendicular to the vertical and radial directions. This means that the work spindle unit, after it has been positioned in a sector or station by the bridge can be moved not only in the radial direction but also transverse to that direction, i.e. generally toward one of the adjoining sectors or vertically or both. This provides an additional measure of flexibility and freedom for machining the workpiece with a multiplicity of tools per machining sector or station.

The bridge unit can have crossing tracks or paths for the working spindle unit and on each of these crossing tracks one or two work spindle units can be provided. The work spindle units thus can be displaceable at right angles to one another, preferably in the same plane and preferably across the central axis so that each work spindle unit is movable along its imaginary linear path on the bridge.

The swingable displacement of the bridge can be effected basically to position the work spindle unit at a machining station or segment for a certain machining operation. The swinging movement which can be a partial displacement of the bridge about the central axis can be in either direction or can be replaced by rotation through more than 360° if desired. The swinging movement can in addition be in part a machining movement with the workpiece in contact with a tool so that during the movement of the bridge one or more workpieces may also be machined.

The radial movement of the work spindle units along the bridge can be completely independent of the pivotal movement of the bridge so that one can take place before or after the other or both can take place simultaneously. However, a mechanical coupling of the movements or a coupling using the control for the movement can be effected if desired. The movement of the workpiece thus need not be a linear or simple arcuate movement but can be a movement representing superimposition of the tangential and radial movements of the bridge and the work spindle unit. The composite movement allows a three-dimensional positioning of the workpiece while rotation of the spindle allows the latter to be rotated as well during a machining operation.

The positioning of the workpiece at the sectors or stations is intended primarily for machining the workpiece at each sector or station. However one or more sectors or stations may be used to mount the workpiece on the work spindle unit or remove the workpiece from it, the mounting and its mounting of the workpiece being effect manually or by suitable automatic mounting and dismounting means.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
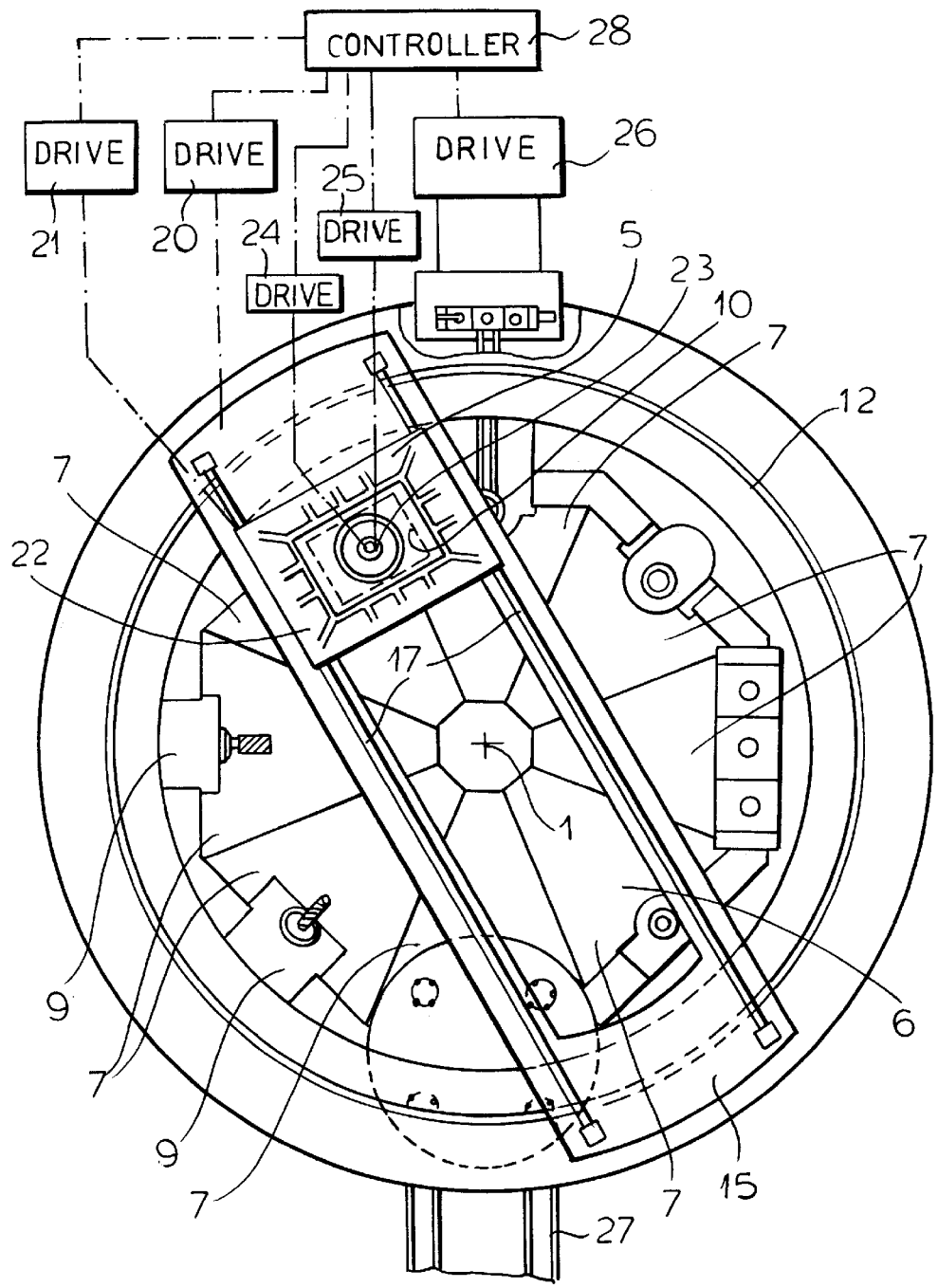
FIG. 1 is a plan view of a part of a machine tool showing the elements important to the invention.

From FIG. 1 it will be apparent that a machine tool according to the invention, here a machining center, can comprise a bridge 15 which is rotatable about a vertical axis 1 also referred to here as a central axis and which runs perpendicular to the plane of the paper in FIG. 1.

On this bridge 15 is a work spindle unit 5 which will be described in greater detail and which can hold a workpiece 10. The work spindle unit 5 is displaceable radially on rails 17 while the bridge 15 is angularly displaceable about the axis 1 on a track 12. The angular drive for the bridge has been represented diagrammatically at 20 in FIG. 1 while the drive for the linear radial displacement of the work spindle unit, i.e. its carriage 22 has been represented at 21. The rotary spindle 23 of the unit has a drive 24 and the vertical displacement of the spindle is controlled by a drive 25. A central controller namely a computer arrangement can control the drives 20, 21, 24 and 26, the latter representing the tool drives for the various machine sectors.

The invention operates by the well known backup principle in which the spindle grips the unmachined workpiece and carries it from a conveyor belt and returns the machined workpiece to the conveyor belt. Details of the backup system have not been provided since they are standard in the art. The workpiece conveyor is, however, visible at 27 in FIG. 1. The controller itself is represented at 28.

Around the central axis there are provided a plurality of machining sectors or stations 7. Each of these sectors or stations has a region in which the workpiece can be machined and within each sector or station there can be one or more tool units 9 with respective tools and drive mechanisms. The tools can be used for carrying out a variety of machining operations which are typical for machining centers and can include grinding, polishing, milling, boring, turning and the like. The tool units 9 are so constructed that they can engage the workpiece and can include feeds for advancing the particular tool into or against a workpiece positioned at the respective station.

The number of machining sectors 7 in the machine illustrated in FIG. 1 is eight. One of these sectors 7 can also be used for mounting and dismounting the workpiece as mentioned and in this sector instead of a tool unit a corresponding workpiece transporter can be provided.

Figure 5:
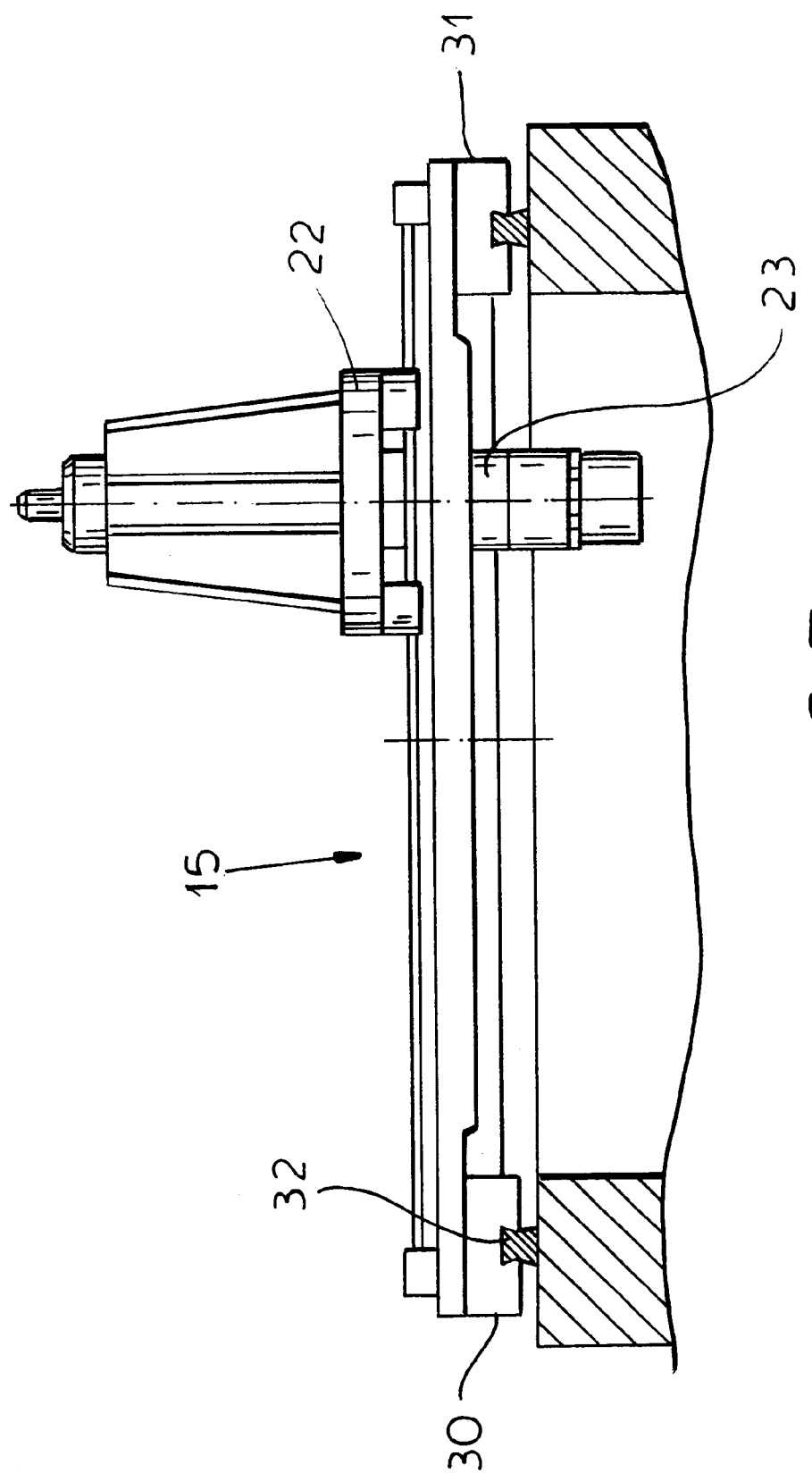
FIG. 5 is a diagrammatic side elevational view of a bridge for use in the system of FIGS. 1 and 2, for example.

As can be seen from FIGS. 1 and 5, the bridge unit 15 may have supports 30 and 31 which can support the bridge stably on a track 12 defining a circular path for the bridge 15. The bridge unit 15 spans an imaginary circle around the central axis 1 and within which the machining sectors or stations 7 are arranged. The bridge unit 15 can be pivoted about the central axis 1 so that an imaginary intersection between the axis 1 and the bridge unit 15 lies precisely at the center of gravity of the bridge unit 15. The track 12 is circular and centered on the axis 1 and the supports 30 and 31 can be provided with low friction elements such as slide bearings, rollers or the like as represented at 32 engaging the track 12 and riding securely thereon.

As can be seen from the plan view of FIG. 1, the bridge unit 15 can have a cutout 6 which extends substantially the full length of the bridge unit from one end to the opposite end. The work spindle unit 5 extends through this cutout 6 to position the workpiece 10 at one or the other of the machining sectors or stations 7. The spindle 23 of the unit 5 extends perpendicular to the drawing plane of FIG. 1 and is vertically displaceable in the carriage 2 which spans the width of the cutout 6.

The carriage 22 is mounted, as has been noted, upon the pair of rails 17 which are parallel to one another and fixed to the upper side of the bridge unit 15, thereby enabling the carriage to be shifted radially from one end of the bridge 15 to the opposite end thereof. The work spindle unit 5 is thus able to be positioned at either end of the bridge and at locations therebetween as controlled by the drive 21.

The workpiece 10 is engaged in a holder on the underside of the spindle and not otherwise visible in the drawing.

Figure 2:
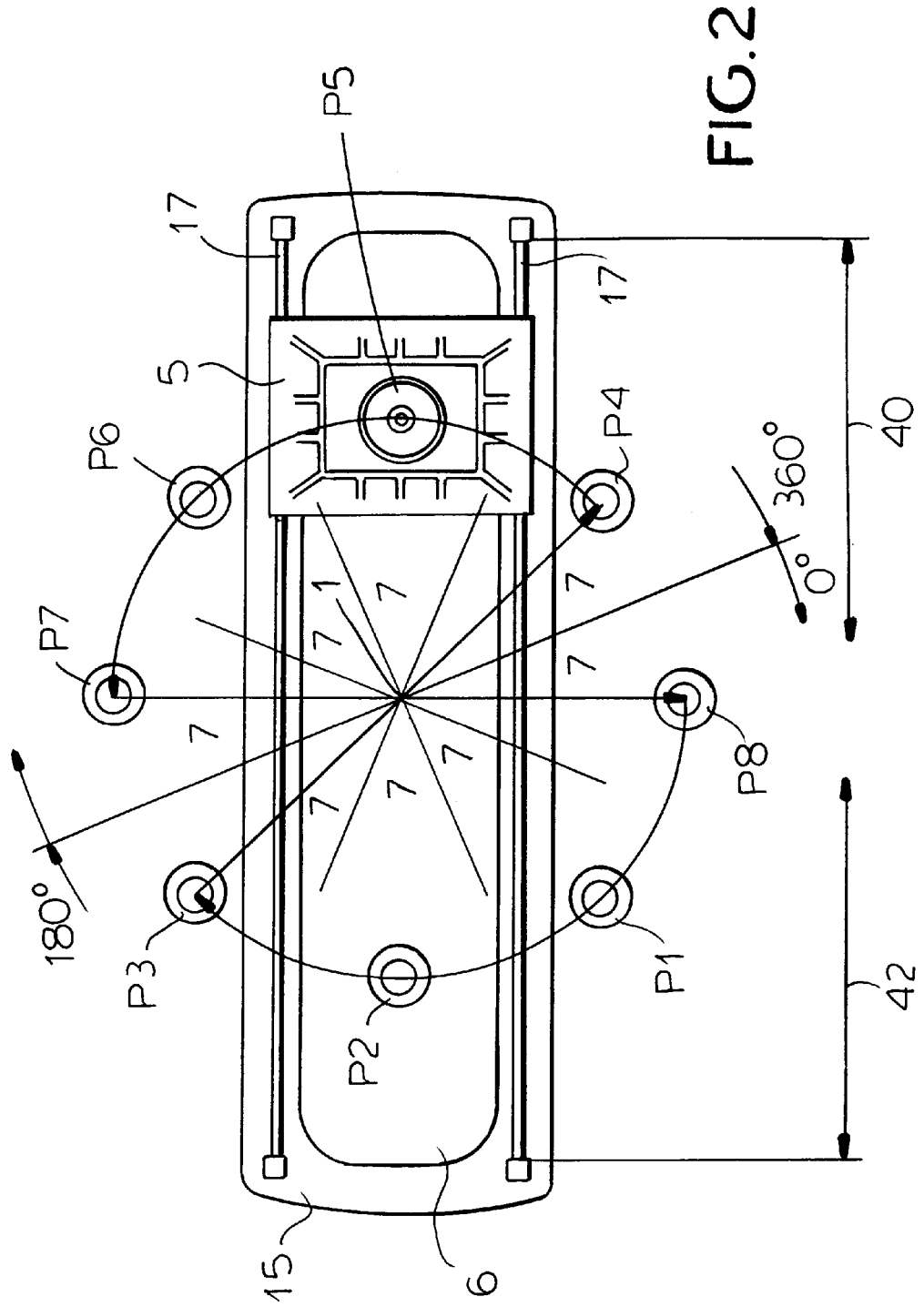
FIG. 2 is a diagrammatic plan view showing the positioning of the work spindle unit.

From FIG. 2 it can be seen that the work spindle unit 5 is located in a first region 40 on the bridge 15. By pivotal or rotational movement of the bridge 15 around the central axis 1, the work spindle unit 5 can be so moved that the workpiece 10 can be positioned in the sectors P4, P5, P6 or P7 separated from one another by 45° and in a clockwise or counterclockwise sense for machining the workpiece with different tools as required. The pivotal movement can be seen to amount to a maximum of say 180°. In the illustrated position, the workpiece is at station P5, whereupon the workpiece is to be moved to the stations P6 and P7.

The pivotal angle at each step can be equal to 45° when the workpiece is to be centrally aligned at the successive stations, greater than 45° if the workpiece is to skip a station or less than 45° if the workpiece is to be positioned off-center at a particular station. As noted, vertical movement of the spindle ensures positioning of the workpiece in contact with and adjacent the tool.

When the workpiece has reached, for example, the stations P4 or P7, the work spindle unit can be shifted radially in the opposite zone 42 of the bridge to allow the workpiece to then be displaced selectively into the positions or stations P8, P1, P2 or P3. The machining at successive stations can involve for example milling with a rotary mill, drilling, grinding or even turning upon rotation of the spindle.

The machining at each sector or station can involve movement of the workpiece in a tangential direction by swinging the bridge, in the vertical direction by vertical displacement of the spindle and in the radial direction by movement of the spindle along the bridge in a radial direction.

The workpiece 10 can be subjected to a variety of machining operations in the different machining sectors or stations with the movement of the workpiece to the tool in each case by the aforementioned combinations of possible movements.

It is also possible to provide in one or more of the machining sectors a plurality of tool units so that the workpiece can be subjected to different machining steps within a sector by corresponding positioning using the spindle, the carriage or the bridge in their respective movements.

The positioning of the work spindle unit 5 or the workpiece 10 clamped thereon at the individual machining positions P1–P8 in the machining sector 7 can be effected as follows:

a) Let us assume that the workpiece 10 is positioned in the machining sector 7 corresponding to the operative position P5 mentioned previously in connection with FIG. 2. The work spindle unit 5 is then in the spindle position zone 40 of the bridge 15.

b) The next machining step is effected at the position P6 immediately to the left of the position P5 and for that purpose the work spindle unit 5 is swung by the bridge 15 to that position through about 45°. The spindle may be raised or lowered in each operating position as desired. The movement of the workpiece to the tool can than be effected by the vertical movement of the spindle and/or the radial movement of the carriage 22 within the zone 40.

c) The next machining step is carried out in the position P7 and for that purpose the bridge is swung through an additional 45° in the same manner as has been described.

d) For the next machining operation the position P8 is used. To move the work spindle unit 5 into the corresponding sector (optionally after vertical movement of the workpiece via the spindle), the carriage is displaced radially along the rails 17 from the first zone 40 to the second zone 42 and the workpiece is displaced relative to the tool in any of the ways described. The positioning of the workpiece at P8, however, does not require swinging of the bridge.

e) The positioning of the unit 5 at the next station P1 can then be effected by rotating the bridge through 45° and any movement of the workpiece with respect to the tool can here be effected by slight angular displacement of the bridge, by radial displacement of the spindle unit 5 in zone 22 and/or by raising and lowering the spindle. Alternatively, the bridge could have spanned positions P7 and P6 and the transfer of the workpiece to position P7 effected by radial displacement of the spindle unit 5.

f) Positioning of the workpieces at P2 and P3 can be effected by angular displacement of the bridge in the manner described while the spindle unit 5 remains in the second zone 42.

g) In position P3 the completed workpiece can be removed and replaced by a blank for machining. The blank can then be transferred to position P4 by a radial displacement of the spindle unit 5 back into the first zone 20. It will be apparent, therefore, that the spindle unit 5 can be positioned at all of the sectors 7 without an angular displacement of the bridge 15 by more than 180°, i.e. by a swinging of the bridge back and forth within 180°, as long as the spindle unit 5 can be displaced from one zone 40 to the other zone 42.

Figure 3:
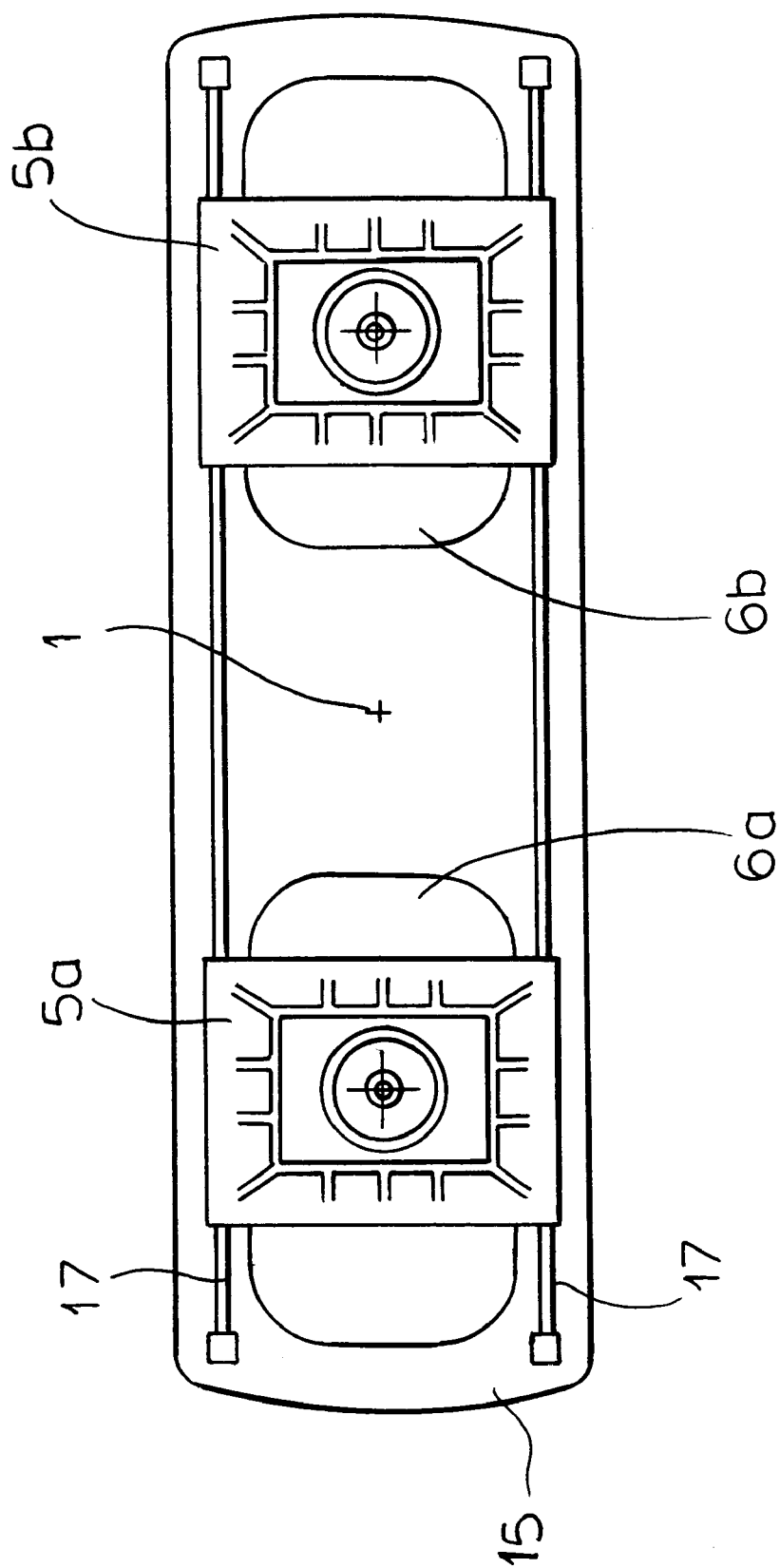
FIG. 3 is a plan view of a bridge provided with two work spindle units.

FIG. 3 shows an embodiment in which two work spindle units 5a and 5b are mounted on the rails 17 and have limited radial mobility within the cut-outs 6a and 6b.

It is also possible to provide two tracks for the two units 5a, 5b or to interrupt the tracks 17.

In this case, the bridge 15 must be rotatable through 360° to allow both workpieces as carried by the spindles to be positioned at each sector. The system of FIG. 3 however allows two workpieces to be machined simultaneously in diametrically opposite sectors and thereby optimize the total machining time for a number of workpieces. For this embodiment as well the radial shiftability of the spindle units within the cut-outs 6a and 6b permits three dimensional positioning of the workpiece within each individual sector as has been described.

Figure 4:
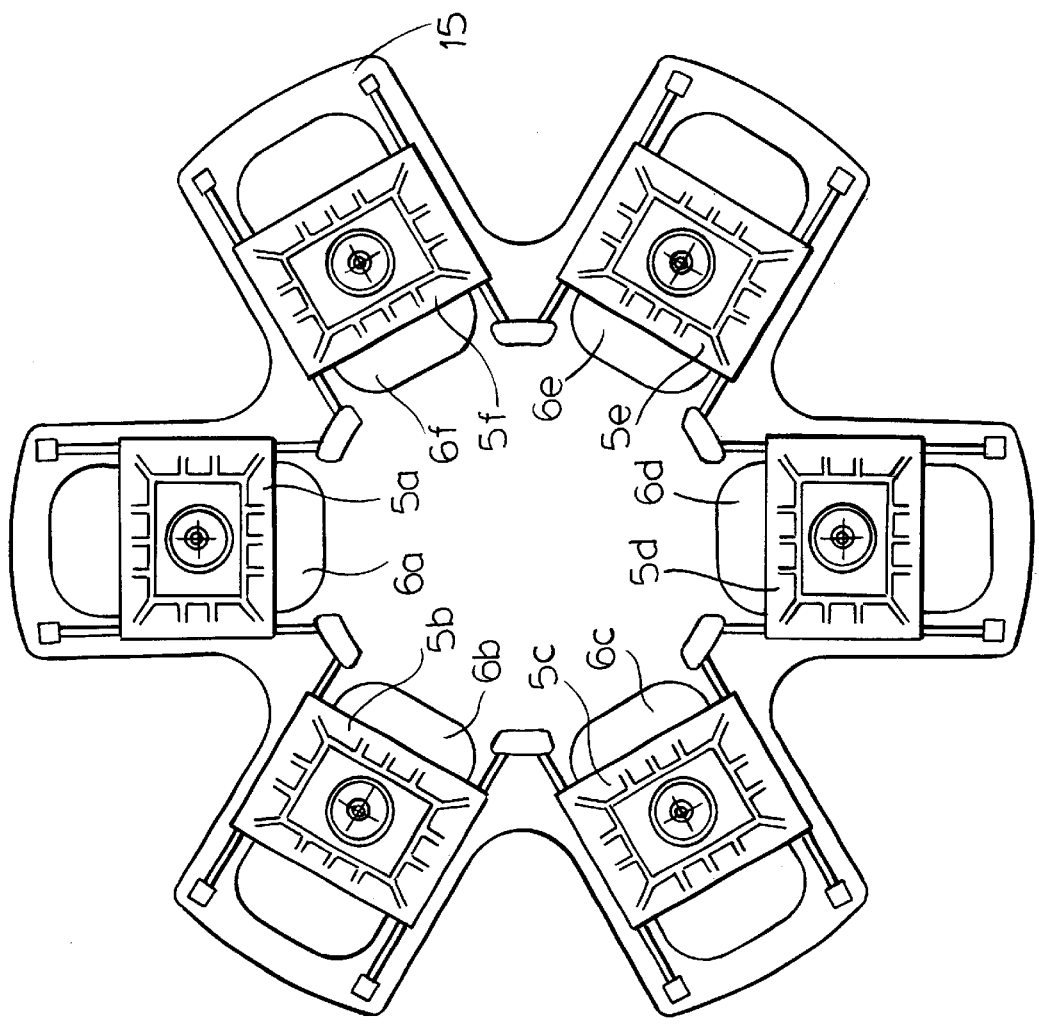
FIG. 4 is a plan view of a bridge having six work spindle units.

The bridge unit 15 of FIG. 4 has six work spindle units 5a–5f, each radially movable within a cut-out 6a–6f. The bridge of FIG. 4 is suitable especially for a machine tool having six machining sectors so that each spindle unit 5a–5f can be located in a respective sector and a corresponding number of workpieces can be simultaneously machined. The bridge can be rotated or swung through 60° between sectors from machining operation to machining operation. By machining the number of work spindle units 5 of the bridge to the number of machining sectors or by providing a ratio of the number of sectors to the number of work spindle units which is a home number, the system can be used to machine a plurality of workpieces at a time, thereby further optimizing the system.

I claim:

1. A machine tool comprising:
   a plurality of machining units disposed in an arcuate array within a substantially cylindrical frame around a central axis thereof and forming respective machining positions spaced apart around said axis and provided with respective tools for machining a workpiece;
   at least one work spindle unit angularly displaceable about said axis and adapted to carry a workpiece capable of being disposed at least at some of said positions for machining by the tool thereof; and
   a support, opposite ends of which are supported on a substantially planar end surface of the frame, for said at least one work spindle unit enabling radial displacement thereof relative to said axis.

2. The machine tool defined in claim 1 wherein said radial displacement of said at least one work spindle unit is independent from the angular displacement thereof about said axis.

3. The machine tool defined in claim 2 wherein said support is a bridge element provided with a rotary track for said at least one work spindle unit.

4. The machine tool defined in claim 3 wherein said bridge element is rotatable about said axis.

5. The machine tool defined in claim 4, wherein said rotary track is a circular track centered on said axis, said bridge element being mounted to move around said track.

6. The machine tool defined in claim 5 wherein said bridge element has legs provided with antifriction elements riding on said circular track.

7. The machine tool defined in claim 3 wherein said bridge element has two zones in which a work spindle unit is radially displaceable on diametrically opposite sides of said bridge element.

8. The machine tool defined in claim 3 wherein the workpiece is displaceable at a respective one of said positions by at least one movement selected from:
   a) rotation of a spindle of said at least one work spindle unit;
   b) vertical displacement of said at least one work spindle unit;
   c) radial movement of said at least one work spindle unit relative to said bridge element; and
   d) tangential movement of said at least one work spindle unit angular displacement of said bridge element.

9. The machine tool defined in claim 8 wherein said workpiece is disposed at one of said positions by at least one of the following:
   a) angular displacement of said bridge element through at most 180°; and
   b) radial displacement of said at least one work spindle unit along said bridge element from one end of said bridge element to an opposite end of said bridge element.

10. The machine tool defined in claim 3 wherein said positions are spaced around said axis and said workpiece is positioned at a plurality of said positions on one side of said axis by angularly displacing said bridge element up to 180° with said at least one work spindle unit in a first radial zone at one end of said bridge element and to positions on an opposite side of said axis by angular displacement of said bridge element and said at least one work spindle unit in another radial zone at an opposite end of said bridge element.

11. The machine tool defined in claim 3, further comprising a controller for angular displacement of controlling said bridge element and radial displacement of said at least one work spindle unit along said bridge element for optimizing the positioning of the workpiece with respect to time.

12. The machine tool defined in claim 3 wherein said at least one work spindle unit comprises two work spindle units that are provided on said bridge element in diametrically opposite relationship.

13. The machine tool defined in claim 3 wherein said bridge element has at least three of the angularly equispaced work spindle units mounted thereon for radial displacement.

14. The machine tool defined in claim 1 wherein each of said work spindle units has a rotary spindle carrying said workpiece.

15. The machine tool defined in claim 1 wherein each of said work spindle units has a vertically displaceable spindle carrying said workpiece.

\* \* \* \* \*